United States Patent [19]

Nakabayashi et al.

[11] 4,276,390

[45] Jun. 30, 1981

[54] FLAME-SPRAYING COATING

[75] Inventors: Masamitsu Nakabayashi; Fumihiro Doura, both of Osaka; Teruo Hori, Ibaraki, all of Japan

[73] Assignee: Takeda Chemical Industries, Ltd., Doshomachi, Japan

[21] Appl. No.: 119,779

[22] Filed: Feb. 8, 1980

[30] Foreign Application Priority Data

Feb. 9, 1979 [JP] Japan ................... 54/14869

[51] Int. Cl.³ .............. C08G 18/62; C08G 18/80; B05D 1/08
[52] U.S. Cl. ...................... 525/61; 427/423; 528/45; 528/902
[58] Field of Search ............. 528/45, 902; 525/61; 427/423

[56] References Cited

U.S. PATENT DOCUMENTS

| | | | |
|---|---|---|---|
| 2,200,429 | 5/1940 | Perrin et al. | 260/80 |
| 2,386,347 | 10/1945 | Roland | 260/86 |
| 2,703,794 | 3/1955 | Roedel | 260/87.3 |
| 3,348,997 | 10/1967 | Lagally et al. | 525/61 |
| 3,400,173 | 9/1968 | Reischl et al. | 525/61 |
| 3,972,865 | 8/1976 | McClain et al. | 525/61 |
| 3,998,768 | 12/1976 | Pettit | 528/902 |
| 4,055,518 | 10/1977 | Kakitani et al. | 528/45 |
| 4,101,473 | 7/1978 | Lander | 528/45 |

OTHER PUBLICATIONS

Annalen der Chemie, 566, 210–237(1950).

*Primary Examiner*—H. S. Cockeram
*Attorney, Agent, or Firm*—Wenderoth, Lind & Ponack

[57] ABSTRACT

A powdered composition comprising (1) an organic polyisocyanate blocked with ethyleneimine and (2) a partially hydrolyzed product of an ethylene-vinyl ester copolymer and/or a carboxyl-modified-product of said partially hydrolyzed product exhibits exceedingly good levelling and post-curing characteristics and is advantageously flame-sprayed to give a coating film having good weatherability, heat resistance and chemical resistance.

7 Claims, No Drawings

FLAME-SPRAYING COATING

The present invention relates to a powdered composition which is used to cover such materials as metal, ceramic substances and glass by means of the flame-spraying method.

Among a variety of conventional powder coating methods, the flame-spraying method which comprises spraying resin powder along with flame features its expediency, and is conveniently employed particularly for coating applications at sites. As examples of the resin powder for flame-spraying application uses there may be mentioned thermoplastic resins such as polyethylene, polypropylene and polyvinyl chloride. The coating films resulting from these thermoplastic resins, nevertheless, have not been proven perfectly satisfactory in terms of the heat resistance, weathering resistance, chemical resistance, etc.

After considerable research carried out in view of the above, the present inventors have come to the finding that a powdered composition of a thermoplastic resin derived from an organic polyisocyanate blocked with a specified blocking agent and a specific polyol, when it is applied by the flame-spraying method, may provide coating films having excellent physical properties, and have completed the present invention.

That is to say, th present invention is concerned with a powdered composition for flame-spraying coating uses which comprises (1) an organic polyisocyanate blocked with ethyleneimine as the first component and (2) a partially hydrolyzed product (hereinafter sometimes referred to as "HEV-ester") of an ethylene-vinyl ester copolymer (hereinafter sometimes referred to as "EV-ester") and/or a carboxyl-modified-product of said partially hydrolyzed product as the second component.

The EV-ester, the raw material for the above-mentioned second component, is a copolymer from ethylene and a vinyl ester monomer. As examples of the vinyl ester monomer there are mentioned vinyl acetate, vinyl propionate, vinyl butyrate, vinyl benzoate, etc., although vinyl acetate among others is preferably used. Suitably employable as the above-mentioned EV-ester are those having a vinyl ester content of 5 to 50% by weight and a melt index of 0.5 to 400 g/10 min. (as measured at 190° C., under a load of 2160 g, for 10 minutes). When the vinyl ester content of the EV-ester is too low, the coating films resulting from the powdered composition according to the present invention are provided with unsatisfactory adherence and physical strength; when it is too high, on the other hand, there are produced coating films with deteriorated water resistance. In case the so-called high-molecular-weight EV-ester having melt index of not more than 0.5 is employed, there may result in slowing too much the softening rate, with inferior flow characteristics. In contrast, when the so-called high-molecular-weight EV-ester having a melt index of not less than 400 is utilized, th resultant coating films may be provided with unfavorable mechanical characteristics such as decreased tear strength and toughness.

The HEV-ester can be produced by hydrolyzing the EV-ester and, the reaction may be conducted under the same conditions as the conventionally known, ordinary hydrolysis reactions; the reaction, for example, can be conducted in a system consisting of low-boiling alcohol (e.g. methanol, ethanol, propanol, etc.) and alkali (e.g. sodium hydroxide, potassium hydroxide, sodium methylate, etc.). In addition, the reaction may be carried out in the presence of a hydrocarbon solvent (e.g. benzene, toluene, xylene, etc.). In this case, the hydrolysis rate (degree of hydrolysis) is 5 to 80%, preferably 40 to 70%. When the hydrolysis rate is too low, the crosslinking effect during formation of coating films becomes poor, and the satisfactory heat resistance of the resultant coating films can not be obtained. If it is too high, in contrast, the softening point increases, with the fluidity deteriorated, thus not providing smooth coating films. The HEV-ester thus produced has a vinyl ester unit content of 1.1 to 48.1% by weight, preferably 1.5 to 33.3% by weight, vinyl alcohol unit content of 0.1 to 25.5% by weight, preferably 1.0 to 21.6% by weight and ethylene unit content of 50.6 to 96.8% by weight, preferably 55.4 to 96.7% by weight. Among them the HEV-ester having a melt index of 5 to 200 is preferably used in the present powdered composition.

A carboxyl-modified-product of the HEV-ester is produced by reacting the HEV-ester with a carboxyl-group containing unsaturated compound or with a cyclic acid anhydride. The reaction can, for example, be conducted in a homogeneous solution system, a homogeneous molten system or a heterogeneous solution system. Though the carboxyl group content is not specifically limited, it is ordinarily preferred to react with the HEV-ester a carboxyl-group-containing unsaturated compound or a cyclic acid anhydride in a proportion of 0.1 to 15% by weight against the HEV-ester.

The carboxyl-group-containing unsaturated compound as hereinbefore mentioned is represented by the general formula of $CHR'=CRCOOH$ wherein each of R and R' stands for hydrogen, an alkyl group, a carboxyl group or a carboxylic acid ester. As specific examples of such compound there may be mentioned acrylic acid, methacrylic acid, crotonic acid, itaconic acid, maleic acid, etc., and these monomers can be used solely or in combination with styrene, acrylate or other ethylenically unsaturated monomers. These monomers are present in such a form as they are grafted to said partially hyrolyzed product through heating together with the HEV-ester and a radical initiator at a temperature of not lower than the decomposition temperature of the radical initiator.

The above-mentioned cyclic acid anhydride is represented by the general formula of

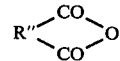

wherein R" is for example a divalent aromatic or aliphatic residue. As specific examples of such cyclic acid anhydride there are mentioned maleic anhydride, succinic anhydride, trimellitic anhydride, glutaric anhydride, phthalic anhydride, itaconic anhydride, Himic anhydride (sold by Hitachi Chemical Company, Japan) and the like. These are assumed to get contained in the HEV-ester in the form of

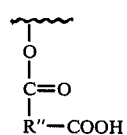

through heating together with the HEV-ester at a temperature of about 50 to 150° C. for about 0.1 to 5 hours to allow them to ring-open by the OH groups of the HEV-ester.

The above-mentioned first component, an organic polyisocyanate blocked with ethyleneimine, can be produced by reacting an organic polyisocyanate with ethylene imine. Examples of such organic polyisocyanate include aromatic, aliphatic and alicyclic isocyanate monomers such as 4,4'-methylene-bis(cyclohexylisocyanate), ω,ω'diisocyanatodimethylbenzene, ω,ω'-diisocyanatodimethylcyclohexane, isophoronediisocyanate, and tolylene diisocyanate, and isocyanate compounds having not less than two functional groups and a molecular weight of not more than 3000, preferably not more than 1500, which are obtained by the addition reaction of an excess of these monomeric isocyanate compounds with compounds having other functional groups, e.g. trimethylolpropane, glycerol, sorbitol and propylene glycol. The reaction between the above mentioned polyisocyanate and ethyleneimine is carried out according to a known procedure in the absence or in the presence of a solvent having no active hydrogen atom. The ratio of NCO/NH in the reaction system is usually in the range of 1.00 –1.05. The reaction may be conducted in the presence of a catalyst such as tertiary amine, an organo-metallic compound.

The powdered composition for flame-spraying coating according to the present invention is obtained by mixing the first with the second component. Such mixing can be carried out by the conventionally known procedures, and may for example be conducted by diisolving the first and second component in an appropriate solvent (e.g., toluene, xylene, etc.) and adding a poor solvent to deposit powdery substances, by melt-mixing the first component with the second one at a temperature of not higher than the diisociation temperature of the first component and crushing after cooling, or by converting the previously powdered second component into a slurry form with a solution of the first component in an appropriate solvent (e.g., methyl acetate, butyl acetate, etc.) and evaporating the solvent to prepare the mixture. Alternatively, both of the components, after they are pulverized, may be subjected to dry blending by the use of commercially available mixing apparata for powdered materials being for example represented by Henschel mixer ® (sold by Mitsui Miike Machinery Co., Ltd., Japan). The proportion in which the components are formulated is about 0.01 to 1 mole, preferably about 0.2 to 1.0 mole, of the isocyanate group of the first component against each 1.0 mole of the hydroxyl group contained in the second component. In the powdered composition, there may be contained additives such as catalysts, plasticizers, fillers, dyes and pigments, in addition to the first and second components. Examples of the catalysts include stannous diacetate, dibutyltin dilaurate or other tin compounds, which may be added in the proportion of about 0.1 to 5% by weight against the first component.

When the powdered composition contains additives, the content of the principal components in the composition is desirably in the range of no less than 50% at least. The present powdered composition can be used to cover various substrates by the flame-spraying methods made known in the already published literature references.

In case the powdered composition is coated on a steel plate, for example, the surface is preheated to 100° to 200° C. by flame of a flame-spraying gun and, then, the powdered composition is propelled from the flame spraying gun at a determined speed to proceed with the coating procedure until the resultant coating is built up to the desired thickness, then the flame is extinguished, followed by allowing thus coated material to cool gradually at room temperature.

Of the conventionally known powdered compositions, a great many present difficulties in levelling and do not provide smooth surface of resulting coating films; in an attempt to make uneven coating surface smooth, propelling of powders is suspended after completion of flame spraying, with heating the surface by a high-temperature flame, merely resulting often in burnings on the coating surface. The powdered composition according to the present invention exhibits exceedingly good levelling and post-curing characteristics and does not require the above-mentioned after-treatment, therefore causing no burning on the surface of coating films. When coating is carried out by the use of the composition according to the present invention, there can be obtained the coating films having weatherability, heat resistance and chemical resistance superior to those of the conventional ones.

The examples are described below to illustrate the present invention more specifically.

In the meanwhile, the testing items as shown in the examples are examined in accordance with the following methods.

(1) Heat resistance of the coating film

The coated plates are placed in a heating device and exposed to the specified temperature for 10 minutes to conduct inspection for softening or melting.

(2) Alkali resistance

The coated plates, after their metal surfaces are protected, are immersed in a 10% aqueous sodium hydroxide solution at 70° C. for 24 hours, and taken out to inspect the appearances for any change.

(3) Solvent resistance

The coated plates are immersed for 5 hours in xylene warmed at 50° C., and taken out to inspect the appearances for any change.

EXAMPLE I

In a Henschel mixer ® are charged fine powders of a partially hydrolyzed ethylene-vinyl acetate copolymer having a melt index of 90, an ethylene unit content of 88.7%, a vinyl alcohol unit content of 7.9% and a vinyl acetate unit content of 3.4% (the original copolymer with a weight ratio of ethylene/vinyl acetate=72:28 used for hydrolysis reaction) and those of 4,4'-methylene-bis(cyclohexylisocyanate) blocked with ethyleneimine in such a proportion as the molar ratio of NCO/OH may be 0.6, and stirring for mixing is conducted while water is passed through the external jacket.

The finely powdered resin composition with an average particle size of 150μ as obtained in this way is flame-sprayed onto a steel plate of 2 mm in thickness preheated in advance at 180° C. by the flame of a flame-spraying gun, until the coated film is built up to the thickness of 300μ.

By way of the control reference (Reference Example 1), in the same manner as described above are flame-sprayed the powders with an average particle size of 100μ of a partially hydrolyzed ethylene-vinyl acetate copolymer having a melt index of 42, an ethylene unit content of 78.4%, a vinyl alcohol unit content of 20.8%, a vinyl acetate unit content of 0.8% and softening point of 105° C.

After allowing these steel plates flame-sprayed to stand in the air to cool gradually, two kinds of resultant coating films are compared for the performances. The results, as shown in Table 1, indicate that the powdered composition according to the present invention exhibits superior physical characteristics.

above procedure, there are obtained fine powders with an average particle size of 150μ.

By the use of the powdered composition as obtained in this way and in the same manner as described in Example 1, coating is effected on the steel plate of 2 mm in thickness and a coating film of 350μ in film thickness is prepared. Tabulated in Table 2 are the results of performance tests conducted with the resultant coated material.

TABLE 2:

|  | Example | | | | | |
|---|---|---|---|---|---|---|
|  | 2 | 3 | 4 | 5 | 6 | 7 |
|  | NCO/OH molar ratio | | | | | |
| Testing items | 0 | 0.2 | 0.4 | 0.6 | 0.8 | 1.0 |
| Appearance | Smooth | Smooth | Smooth | Smooth | Smooth | Smooth |
| Heat resistance | Softened and molten at 100° C., with a wet, sticky surface | Slightly softened at 150° C. | The same as Example 3 | Not softened at 150° C. | The same as Example 5 | The same as Example 5 |
| Alkali resistance | Slightly cloudy | No change | The same as Example 3 | The same as Example 3 | The same as Example 3 | The same as Example 3 |
| Solvent resistance | Dissolved with the coating film disappearing from the metal surface. | Swollen | Slightly swollen | Slightly swollen | Slightly swollen | Slightly swollen |

TABLE 1:

|  | Example 1 | Reference Example 1 (Partially hydrolyzed ethylene-vinyl acetate copolymer with high softening point) |
|---|---|---|
| Appearance | Smooth | Rough (uneven). Remarks: Exposure to flame to smoothness after flame-spraying produces burning partly. |
| Heat resistance | Not softened at 150° C. | Softened at 110° C., and with wet and sticky surface. |
| Alkali resistance | No change | Marked whitening, with part of the film peeled off from the metal surface. |
| Solvent resistance | Slight swelling | Dissolved, with the film disappearing from the metal surface. |

EXAMPLES 2 THROUGH 7

In a Henschel mixer ® are charged fine powders of a graft-modified product (melt index, 75), produced by grafting with 1.0% by weight of acrylic acid a partially hydrolyzed ethylene-vinyl acetate having an ethylene unit content of 88.7%, a vinyl alcohol unit content of 7.9% and a vinyl acetate unit content of 3.4% (the original copolymer with a weight ratio of ethylene/vinyl acetate=72:28 used for hydrolysis reaction), and those of ω,ω'-diisocyanato-1,3-dimethylcyclohexane blocked with ethyleneimine in such a proportion as the molar ratio of NCO/OH may be as shown in Table 2, and mixing is conducted while cooling the jacket. By the

What is claimed is:

1. A powdered composition for flame-spraying coating, which comprises (1) an organic polyisocyanate blocked with ethyleneimine and (2) a partially hydrolyzed product of an ethylene-vinyl ester copolymer and/or a carboxyl modified product of said hydrolyzed product the proportions of said components being 0.01 to 1 mole of the isocyanate group of component (1) to each 1.0 mole of the hydroxyl group contained in component (2).

2. A powdered composition as claimed in claim 1, wherein the partially hydrolyzed product is one having a vinyl ester unit content of 1.1 to 48.1% by weight, vinyl alcohol unit content of 0.1 to 25.5% by weight and ethylene unit content of 50.6 to 96.8% by weight.

3. A powdered composition as claimed in claim 1, wherein the partially hydrolyzed product is one having a vinyl ester unit content of 1.5 to 33.3% by weight, vinyl alcohol unit content of 1.0 to 21.6% by weight and ethylene unit content of 55.4 to 96.7% by weight.

4. A powdered composition as claimed in claim 1, wherein the partially hydrolyzed product is one having a melt index of 5 to 200.

5. A powdered composition as claimed in claim 1, wherein the carboxyl-modified-product is one obtained by reacting with the partially hydrolyzed product a carboxyl-group containing unsaturated compound or a cyclic acid anhydride in a proportion of 0.1 to 15% by weight against the partially hydrolyzed product.

6. A powdered composition as claimed in claim 4, wherein the cyclic acid anhydride is maleic anhydride or phthalic anhydride.

7. A powdered composition as claimed in claim 4, wherein the carboxyl-group containing unsaturated compound is acrylic acid.

* * * * *